Sept. 14, 1948.  R. G. STARLING  2,449,091
MACHINE FOR TESTING CLUTCH AND BRAKE ASSEMBLIES
Filed Jan. 23, 1945
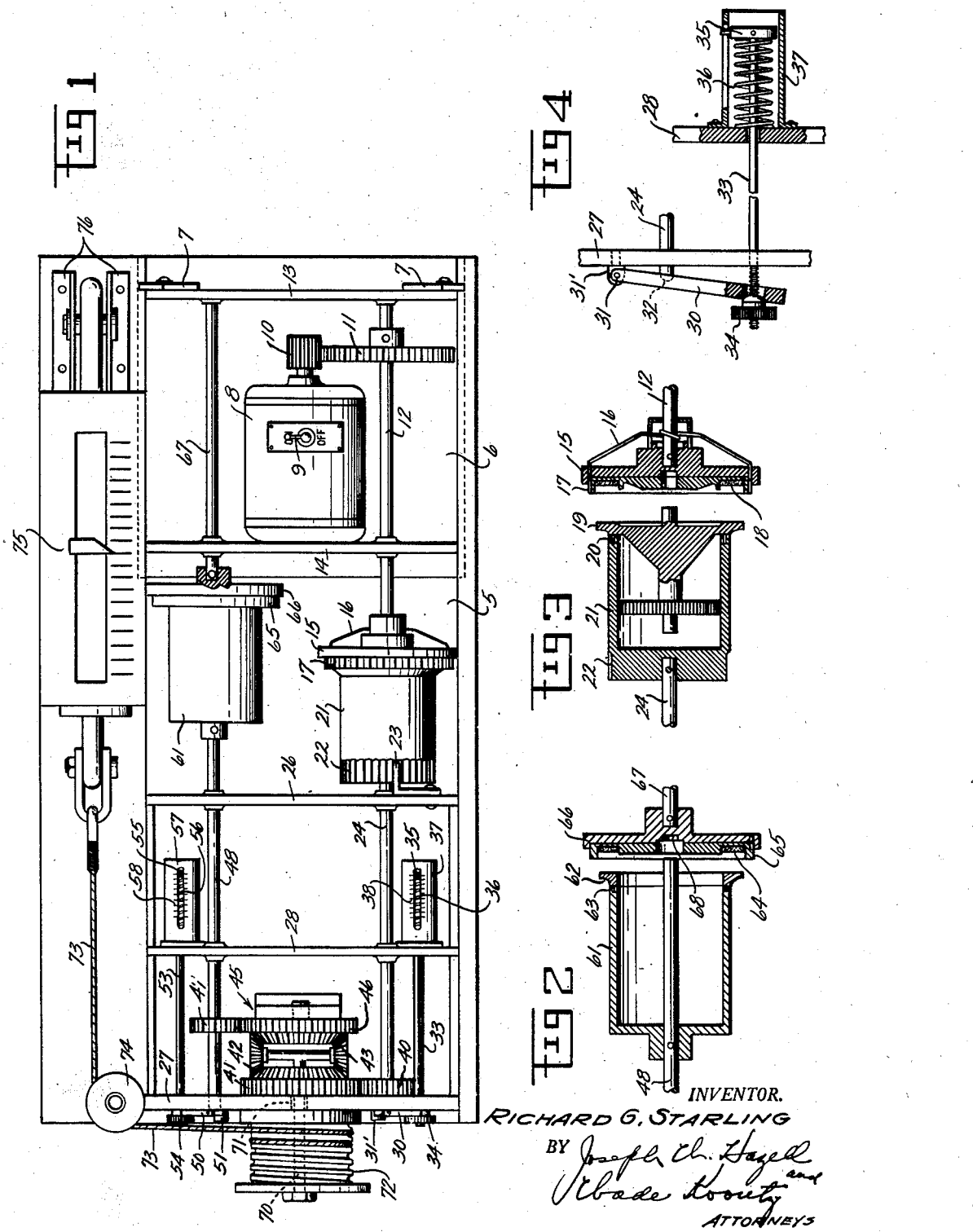
INVENTOR.
RICHARD G. STARLING
BY
ATTORNEYS Patented Sept. 14, 1948

2,449,091

UNITED STATES PATENT OFFICE 2,449,091

MACHINE FOR TESTING CLUTCH AND BRAKE ASSEMBLIES

Richard G. Starling, Harviell, Mo.

Application January 23, 1945, Serial No. 574,173

4 Claims. (Cl. 73—121)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a machine for testing clutch and brake assemblies, and more particularly for testing the plate and cork-disc assemblies of the clutch and the brake as used on servomotors of automatic pilots on airplanes.

In automatic pilots of airplanes, especially in the C-1 pilots, electric servomotors are employed for actuation of the airplane controls, and the servo mechanism comprises a clutch which includes a plate and a cork-disc forming the two frictionally engaging elements for transmitting power from an electric motor to a cable drum, and when the electric motor is de-energized the clutch releases, and a brake which includes a plate and a cork-disc holds the cable adjusting mechanism in its adjusted position. In servicing the servo mechanism, a great deal of trouble has been encountered in obtaining the proper clutch and brake characteristics; that is, a clutch to transmit the proper torque and also to release promptly, and a brake to hold without slipping. In making repairs it has also been necessary to make repeated adjustments by tearing down and reassembling the units, and thus delaying the return to use of the airplane and also causing an excessive expenditure of time of the mechanics.

It is an essential object of this invention to provide a machine for testing the clutch elements and the brake elements while disassembled, so as to permit adjustment to be made and likewise defective clutch parts and brake parts to be found and replaced before they are installed; whereby the tested units may then, after any required adjustment and repair, be reassembled in the servo mechanism without any need for further adjustment, thus saving a great deal of time. Such testing mechanism is furthermore useful in the testing of the clutch and brake assemblies in the course of manufacture.

Another object of this invention is to provide a clutch and brake testing machine which is capable of individual as well as joint and simultaneous testing of the associated clutch and brake assemblies of such airplane servo mechanism and the like, and thereby shortening the testing operation and hastening return of the airplane to use and also saving man-hours of work of the mechanics.

Other objects and advantages will more fully appear from the following description taken in connection with the accompanying drawings wherein this invention is shown in its preferred form of construction.

In the drawings:

Fig. 1 is a plan view showing my invention in its operative position.

Fig. 2 is a longitudinal sectional view of the pair of chucks having the two companion brake elements removably mounted therein.

Fig. 3 is a longitudinal sectional view of the pair of chucks having the two companion clutch elements removably mounted therein.

Fig. 4 is an enlarged longitudinal sectional view of the pressure indicator used for the clutch assembly, and which construction is likewise used for the brake assembly.

In the form of construction illustrated in the accompanying drawings this invention comprises a base plate 5 supporting a sub-base or carrier member 6 slidable longitudinally thereon and held in place by latches 7 engaging side ridges on said base plate 5. Upon said carrier member 6 is mounted an electric driving motor 8 which can be energized by manipulation of a control switch 9, and the motor armature shaft has a gear 10 mounted thereon, which drives a spur gear 11 mounted on a shaft 12 suitably journaled in bearings provided in vertical supporting plates 13 and 14 which are secured on said member 6 and are therewith slidable longitudinally outwardly on the base 5, to facilitate insertion and removal of the clutch and brake elements.

The means for holding the clutch elements for the testing operation include a chuck 15 secured on the inner end of shaft 12 to rotate with the shaft, and said chuck is provided with spring means 16 whose ends removably engage a retaining gear 17 faced with a washer-shaped cork-disc 18, said parts 17 and 18 together forming one part or element of the clutch assembly to be tested. A clutch plate 19, which forms a second part or element of the clutch assembly to be tested, is provided with rear pins 29 wherewith it is removably secured in a cylindrical centering holder or chuck 21, said chuck being provided with external ratchet teeth 22 adapted to cooperate with a pivoted pawl 23 which permits the chuck 21 to rotate freely in one direction only. Said chuck 21 is mounted on the end of a shaft 24 which is suitably journaled in bearing plates 26, 27 and 28 secured to base plate 5.

The shaft 24 is axially movable as well as rotatable, and at its outer end it is seated in a pivot pocket 32 formed in the intermediate part of a lever or arm 30 which has its upper end pivoted at 31 to a lug 31' on the supporting plate 27. Through the lower end of said lever extends a rod 33 provided at its outer end with an adjustable thumb nut 34, which bears on the lever, and at its inner end with a head or abutment 35 which bears on a calibrated spring 36 housed in a tubular housing 37 mounted on the plate 28 and slotted at its upper side to give a visual indication of the position of the head or abutment 35 relative to a scale 38 marked in pound units on the upper side of the housing 37, as illustrated in Figs. 1 and 4. The arm or lever 30 serves to apply a predetermined thrust to shaft 24, as determined by the tension loading applied to rod 33 by spring 36, the loading of which is adjustable manually by thumb nut 34. The preset thrust on shaft 24 thus applies a predetermined pressure on clutch elements 18 and 19 which are to be tested.

The shaft 24 has a gear 40 rigidly mounted thereon and provided with a wide tooth face so as to remain in mesh with a gear 41 which forms an input to a side gear 42 of a differential unit 45, said differential unit being suitably supported from support 27 and has its opposite side gear 43 mounted on a gear 46 which meshes with a wide faced gear 47 which is rigidly mounted on a shaft 48 journaled for free rotation and axial movement in bearings provided in supporting members 26, 27 and 28. The shaft 48 is adapted to be adjustably loaded in its axial direction, by means of a lever 50 pivoted at 51 on plate 27, and further means and manner identical to that of shaft 24 shown in Fig. 4. Said lever has a bearing pocket, like the pocket 32 in lever 30, wherein the end of shaft 48 bears rotatably, and the lower end of said lever bears against an adjustable thumb nut 54 secured to the end of a tension rod 53 which extends through said lever and is provided with a head or abutment 55 engaging a calibrated loading spring 56 housed in a tubular housing 57 which is provided with a loading scale 58, similar to the scale 38 on housing 37 of Fig. 4. Adjustment of thumb nut 54 provides a means for applying any desired predetermined axial loading on shaft 48.

The shaft 48 is provided at its inner end with a cylindrical chuck 61 which is adapted to center and hold an annular brake pressure plate 62, as by the use of pins 63, forming one part of the brake elements to be tested; and it is adapted to engage a washer-shaped cork-disc 64 carried on the face of an annular backing plate 65 which forms the second element of the brake to be tested. The cork-disc 64 with its backing plate 65 is firmly but removably held in a stationary chuck 66 which is secured on a shaft 67 rigidly mounted on said plates 13 and 14, said shaft 67 being removable and likewise slidable longitudinally with said plates and sub-base 6 relative to base plate 5. The shaft 48 extends through the chuck 61 and is centered and rotary in a bearing pocket 68 provided in the stationary chuck 66, and said shaft 48 is thus permitted rotational and axial movement and insures concentricity between the brake elements while being tested.

The carrier of the differential unit 45 is drivingly connected to an output shaft 70 which is journaled in a suitable bearing, as indicated at 71, and the shaft has a cable drum 72 secured to its outer end which is of the same diameter as is the drum employed in the servo mechanism for actuating the control cable. A cable 73 is secured at one end to said drum and is wrapped around the drum and then passes over a guide pulley 74 which is rotatably supported on base 5, and the cable at the other end is secured to the load applying member of a conventional spring-type scale 75 the frame of which is secured at its parts 76 to the base 5. This scale is graduated in pound units, but in reality indicates the torque applied to the cable drum in foot pounds, and since the drum radius is constant for all servo-motors, the reading in pounds on this scale of my machine is all that is required for comparison purposes. The cable drum 72, cable 73 and spring balance 75 together form a dynamometer for applying loads of definite magnitude to the differential unit 45.

In making a test with this machine, the clutch and the brake assemblies are placed in the chuck units, 15—21 and 61—66, respectively, and the brake pressure is adjusted by adjusting the axial loading on shaft 48 until it is certain that the brake will not slip. The motor 8 is then energized and, as the torque applied to the drum 72 increases, the reading on the scale 75 likewise increases until the clutch slips; and by adjusting the clutch loading pressure to a known predetermined value, it can be readily determined whether the clutch will or will not slip within a known torque range, and hence whether the same will be satisfactory. Similarly, the clutch may be adjusted by increase of pressure through actuation of adjusting nut 34 until the clutch will not slip within a known predetermined torque range, and the brake loading can then be adjusted to a predetermined value by actuating the adjusting nut 54 enabling a rapid determination of the slipping point or limit of the torque applicable to the brake. The characteristics of both units, while operating simultaneously, may also be readily checked by adjusting the clutch and the brake loadings by actuating the respective adjusting nuts 34 and 54, to the desired predetermined values, and then energizing the driving motor and determining whether the clutch will transmit a desired torque without slip and also whether the brake will hold without slip within that desired range. By thus rapidly checking simultaneously both the clutch and the brake assemblies, it will be known whether such units are serviceable and actually what loading is necessary to obtain the desired results, and thus there will be no need for repeated assembly and disassembly of the servo mechanism to obtain satisfactory results.

I claim:

1. A machine for simultaneously testing both the clutch and the brake assemblies of the type wherein each of said assemblies includes a pair of elements having frictional engagement, said machine comprising two pairs of holding members, one pair for holding the companion clutch elements and one pair for holding the companion brake elements in operative frictional engagement, differential gear means operatively connecting one of the clutch holding members with one of the brake holding members, means for driving one of the two remaining holding members and also means for holding the last of said holding members, a pair of individual loading pressure indicators, means operatively connecting one thereof with the clutch and the other with the brake, a dynamometer and means operatively connecting it with said member-connecting differential gear means to be actuated thereby during the operation of the machine to indicate simultaneously the range of the torque loading of the combined clutch and brake assemblies.

2. A machine for simultaneously testing both the clutch and the brake assemblies of the type wherein each assembly includes a pair of elements having frictional engagement, said machine comprising two pairs of chucks, one pair for holding the companion clutch elements and the other pair for holding the companion brake elements in operative engagement, means operatively connecting one of the clutch chucks with one of the brake chucks, means for rotating one of the two remaining chucks and also means for holding the last of the chucks stationary during the testing operation, a pair of individual loading pressure indicators operatively connected with said chuck connecting means, one for the clutch and one for the brake, a differential unit interposed in said chuck connecting means and including a rotary member having secured thereon a cable drum, a spring balance and a cable connecting it with said drum and actuated by the operation of the machine and rotation of the drum to indicate the range of the torque loading of the combined clutch and brake assemblies.

3. A machine for simultaneously testing both the clutch and brake assemblies of the type used with servomotors of automatic pilots on airplanes and wherein each assembly comprises two companion elements including a plate and a cork-faced member having frictional engagement, said machine comprising two pairs of chucks and a supporting shaft on each chuck, one pair of chucks for firmly holding the companion clutch elements and the other pair for firmly holding the companion brake elements, means for operatively connecting one of the clutch chuck shafts with one of the brake chuck shafts, a differential unit interposed in said connecting means and including a rotary member carrying a drum to rotate therewith, means for rotatably driving the other of the clutch chucks and its shaft, means for holding the other of the brake chucks and its shaft stationary, a pair of pivoted levers, each for engaging and impeding rotation of one of said two connected clutch and brake shafts, a pair of pressure indicators operatively connected with said levers, one for individually indicating the pressure loading applied to the clutch elements and the other for indicating the pressure loading applied to the brake elements, means for adjusting the pressure of said levers on said shafts, and a spring balance connected with said drum to be actuated by rotation thereof and arranged and constructed to indicate simultaneously the torque loading in pounds applied to the combined clutch and brake elements.

4. A machine for simultaneously testing both the clutch and brake assemblies of the type used with servomotors and wherein each assembly comprises two companion elements including a plate and a companion cork-faced member operable together by frictional engagement, said machine comprising two pairs of chucks, one pair for holding the companion clutch elements and the other pair for holding the companion brake elements, differential gear means for operatively connecting one of the clutch chucks with one of the brake chucks, means for rotatably driving the other of the clutch chucks, means for holding the other of the brake chucks stationary, a pair of pressure indicators, one being operatively connected with said one of the clutch chucks and the other with said one of the brake chucks, one for individually indicating the pressure applied to the clutch elements and the other for indicating the pressure applied to the brake elements, and a dynamometer operatively connected with said differential gear means connecting the two chucks and actuated by the operation of the rotatably driven chuck to indicate in pounds the torque loading on the combined clutch and brake assemblies.

RICHARD G. STARLING.

REFERENCES CITED

The following references are of record in the file of this patent:

UNITED STATES PATENTS

| Number | Name | Date |
|---|---|---|
| 1,490,603 | Elverson | Apr. 15, 1924 |
| 1,587,894 | Bronk et al. | June 8, 1926 |
| 1,711,866 | Williams | May 7, 1929 |
| 1,890,219 | Graham et al. | Dec. 6, 1932 |
| 2,050,887 | Howarth | Aug. 11, 1936 |
| 2,325,046 | De Rentiis | July 27, 1943 |